March 3, 1964

L. W. HAERTHER ETAL 3,123,418

CHASSIS UNIT INSERT TIGHTENING-EXTRACT DEVICE

Filed Oct. 3, 1962

INVENTORS
LESTER W. HAERTHER
BY PAUL A. ZIMMERMAN

*Moody and Knitzinger*
ATTORNEYS

March 3, 1964   L. W. HAERTHER ETAL   3,123,418
CHASSIS UNIT INSERT TIGHTENING-EXTRACT DEVICE
Filed Oct. 3, 1962   2 Sheets-Sheet 2

INVENTORS
LESTER W. HAERTHER
BY PAUL A. ZIMMERMAN

*Moody and Kintzinger*
ATTORNEYS

United States Patent Office 3,123,418
Patented Mar. 3, 1964

3,123,418
CHASSIS UNIT INSERT TIGHTENING-EXTRACT DEVICE
Lester W. Haerther, Cedar Rapids, and Paul A. Zimmerman, Amana, Iowa, assignors to Collins Radio Company, Cedar Rapids, Iowa, a corporation of Iowa
Filed Oct. 3, 1962, Ser. No. 228,049
11 Claims. (Cl. 312—319)

This invention relates to the insertion and extraction of rack mounted electronic units and in particular to a screw thread insert tightening and extract device, for chassis units, having a collar which may be rotatably positioned manually for the insert tightening or extraction of various associated chassis units, as desired.

Many chassis units for rack mounted electronic systems are provided with guide pins, either front or rear or both, and plug-in connectors, imposing a requirement that considerable force must be exerted on the chassis unit being inserted or extracted for full engagement or disengagement of the guide pins and plug connectors. Obviously, it is important that full engagement of chassis uints be insured and maintained not only for proper electrical connection through the plugs, but also to insure proper seating of a module or chassis unit in a rack, particularly when severe vibration conditions are likely to be encountered.

It is, therefore, a principal object of this invention to provide manual force multiplying means for inserting and extracting chassis units to and from a rack.

A further object is to provide for selectively connecting each force multiplying insert and extraction device for insertion or extraction of one or more associated chassis units, as desired.

Features in the accomplishment of these objects include the provision of a threaded screw type device operationally received in a threaded opening in a shelf of a rack for mounting and securing multiple chassis units. A double flanged collar, having a D-shaped front or outer flange and a cut down generally quarter section shaped rear or inner flange, is rotatably mounted on the shank of the screw device between two collars axially fixed on the shank, as by press fits thereon. The collar is rotatably positionable for engaging one or more of the associated chassis units for either insertion or extraction into or from a rack shelf of the operationally engaged chassis unit or units, as desired.

A specific embodiment representing what is presently regarded as the best mode of carrying out the invention is illustrated in the accompanying drawings.

In the drawings:

FIGURE 1 represents a partial perspective view of a rack with electronic chassis units mounted both above and below a rack shelf;

FIGURE 2, a partially cut away and sectioned side view showing details of an insertion and extract screw device threaded into position for exerting insert tightening force on an upper module, and with a lower module already tightened into position;

Figures 5, 6:
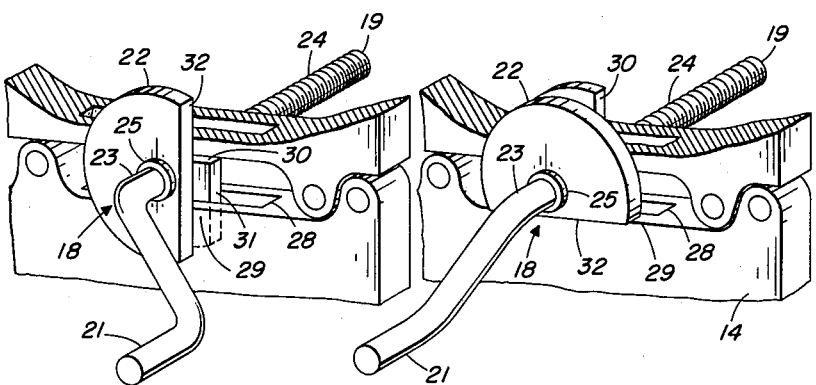
Figure 7:
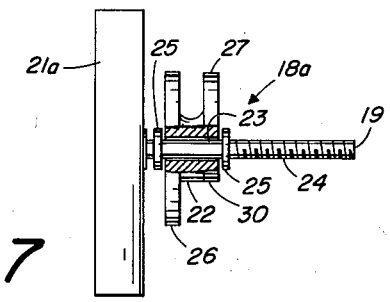

FIGURE 5, the collar of the device positioned for insertion and hold of both an upper and lower associated chassis unit, or extraction of a lower chassis unit;

FIGURE 6, the screw insert-extract device with the collar positioned for insertion of and hold, or extraction of the upper associated chassis unit; and FIGURE 7, a partially cut away and detailed view of another screw insert-extract embodiment.

Figure 1:
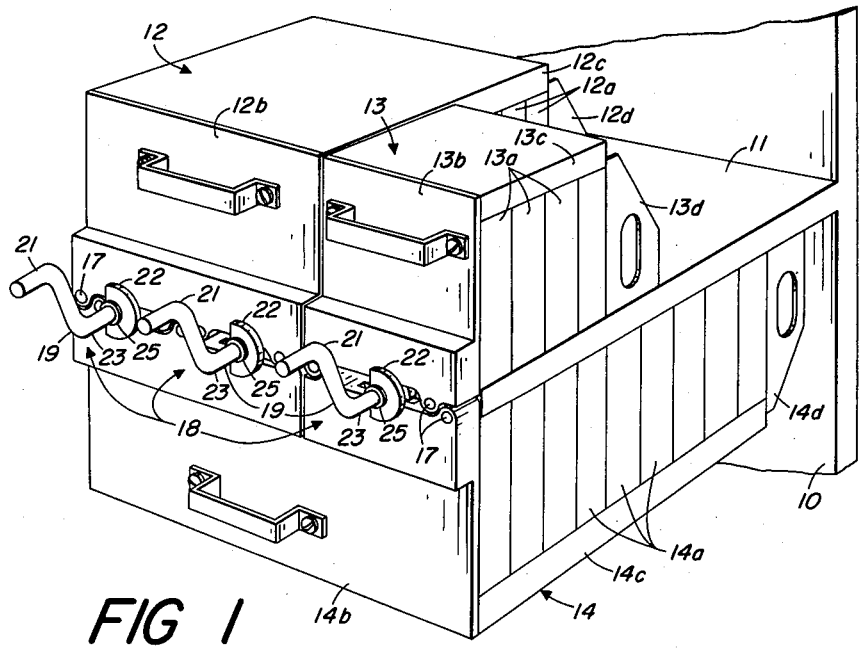
Figure 2:
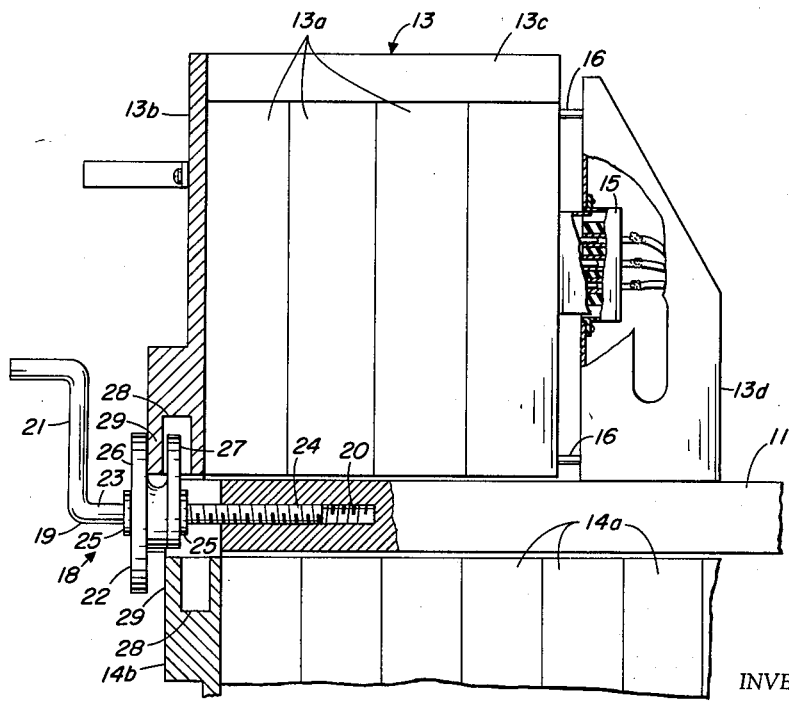

Referring to the drawings:

The rack 10 of FIGURE 1 is shown to have a shelf 11 which mounts two upper electronic chassis units 12 and 13, and a lower chassis unit 14. These chassis units are of various widths and of various lengths accommodating various quantities of module sections 12a, 13a and 14a, respectively. The chassis units are equipped with front plates 12b, 13b, and 14b, and when fully inserted on shelf 11 of the rack are in snug bearing contact with rear mounting brackets 12d, 13d and 14d, respectively. The rear mounting brackets and the chassis units may, as shown in FIGURE 2 for chassis unit 13 and bracket 13d, be equipped with plug-in connectors 15. Alignment guide pin means 16 are used for insuring proper positioning in mating of the plug-in connectors 15 between the chassis units and rear brackets as the units are being inserted into place. These units may also be provided with front guide pin means 17 interconnecting the front of shelf 11 and front plates 12b, 13b and 14b, respectively, in a conventional manner, and may also be provided with plug-in connectors, not shown, between the front plates and shelf 11 just as indicated with connectors 15 at the rear of chassis unit 13.

Insert-extract devices 18, each including a threaded screw 19, are operationally received in threaded openings 20 of rack shelf 11. Each of the insert-extract devices 18 is shown to have a manually operated outer crank arm 21 and are also equipped with a double flanged collar 22 rotatably mounted on shank 23 between the threaded portion 24 and the crank arm 21. The collars 22 are axially restrained on shanks 23 of respective threaded screws 19 by front and rear rings 25 axially fixed on the shanks 23, as by press fits, or by pinning in a conventional manner. The forward or outer flange 26, of each collar 22, is generally D-shaped, and the rear or inner flange 27 is partially a duplicate of and in longitudinal alignment with the front D-shaped flange except that it is cut down from one end to form generally an enlarged quarter or pie-shaped section.

The outer flange 26 and inner flange 27 shapes are useful for performing guide pin and the plug-in connector insert engagement, securing hold, and disengaging functions on various associated chassis units as desired. Four main collar 22 positions, shown in FIGS. 3, 4, 5, and 6, generally at 90° from each other, are utilized although the collar is by no means limited to only these four positions for various appropriate insert, hold, and extract actions, as desired. The screw and D collar insert-extract device 18 by manual rotation of crank arm 21, one direction or the other, can positively insert, tighten to secure hold, or extract chassis units selectively that are mounted above and below rack shelf 11, as desired, or for that matter, on either side of a vertical rack shelf, not shown.

Figure 3:
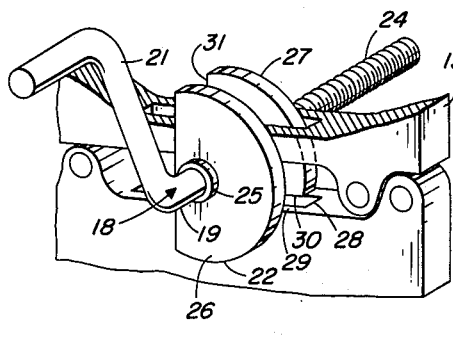
FIGURE 3 shows a partial perspective view of an insert-extract device with its collar positioned for extraction of an upper unit, or insertion of both an upper and a lower chassis unit.
Figure 4:
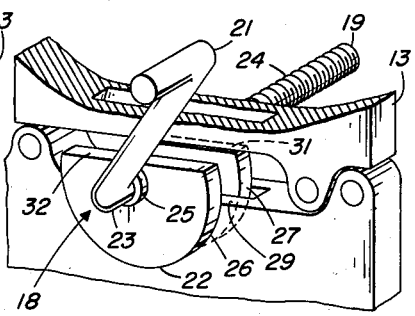
FIGURE 4 is shown in position for insertion and hold, or extraction for a lower chassis unit.

Front plates 12b, 13b and 14b each have a lipped recess 28 into which a collar inner flange 27, of an insert-extract device 18, may be selectively positioned by manual rotation of respective collars 22, as desired for extraction of a chassis unit. With this collar setting inner flange 27 is positioned for operationally engaging the inner surface of outer lip 29 of the respective recess 28 during extract of a chassis unit. The collar 22 may be positioned, as shown in FIGURE 3, for engagement of inner flange 27 with the inner surface of the outer lip 29 of an upper chassis unit 12, or 13, as the case may be, and the crank arm 21 rotated for threading screw 19 of the insert-extract device 18 outwardly with respect to threaded opening 20 for extraction of the upper chassis unit. The collar 22 position of FIGURE 3 may also be used for insertion, and the tightened hold state of the upper chassis unit 12, or 13, and in like manner simultaneously with the associated lower chassis unit 14 through force transmitting contact between outer flange 26 and the outer faces of the respective chassis unit front plates. Of course, collar 22 also may be rotatably positioned as shown in FIGURES 4 through 6, and to other positions.

The relatively friction free rotational mounting of collar 22 on shank 23 enables the collar to be held in the position set, even though the crank arm 21 and screw 19 are being rotated for moving the device 18, including collar 22, in or out. Collar 22 is normally held in position either by friction engagement between flange 27 and the inner surface of a lip 29 during extract, or between flange 26 and the outer surface of the respective front plate or plates 12b, 13b, and 14b. A conventional friction hold or lock device (not shown) could be used for holding manually set positions of collar 22. A friction position lock device of a conventional nature (not shown) could be used for holding manually set positions of screw 19 under vibration conditions.

Obviously, surface 30 of inner flange 27 must clear lower chassis unit 14 when collar 22 is in position, as shown in FIG. 3, for extracting upper chassis unit 13, and it must likewise clear upper chassis unit 13 when collar 22 is in position, as shown in FIG. 5, for extracting lower chassis unit 14. In like manner, the additional surface 31 of inner flange 27 must clear upper chassis unit 13 when collar 22 is in the position of FIGURE 4, and must also clear lower chassis unit 14 when the collar is in the position of FIGURE 6. Furthermore, surface 32 of outer flange 26 must clear upper chassis unit 13 when collar 22 is in the poistion of FIGURE 4 for inserting, and tighten hold of lower chassis unit 14, and must also clear lower chassis unit 14 when the collar is in the position of FIGURE 6.

Manually actuating the crank screw 19, which is threaded into shelf 11, in one direction, allows forcing of a chassis unit, or units, onto front and rear guide pins, mating engagement of plug-in connectors, and securing the units in position. Reverse action will pull a selected unit off the guide pins and unconnect its plug-in connectors. This may be accomplished with one insert-extract device 18 acting on a single upper chassis unit and/or a single lower chassis unit, or in various combinations, as shown in FIGURE 1, of multiple insert-extract devices 18 operating together on upper and lower chassis units.

Reference to FIGURE 7 shows a wing head 21a used in place of crank arm 21 for manually turning screw 19, and it would be readily apparent to those skilled in the art that a screw 19 could be driven as by a wrench driven head, a screw driver in a slot, and other suitable drive means.

Whereas this invention is here illustrated and described with respect to several specific embodiments thereof, it should be realized that various changes may be made without departing from the essential contribution to the art made by the teachings hereof.

We claim:

1. Apparatus for insert tightening, position hold, and extracting of a chassis unit from a self of a mounting rack, comprising: a screw member operatively received in a threaded opening in the rack shelf; said screw member having a shank; a flanged collar rotatably mounted on the shank of said screw member; means axially restrained on the shank of said screw member restraining said collar from movement in either direction axially along the screw member; a chassis unit front plate with a recess having an outer lip with an inner surface at an edge thereof for selectively receiving a flange of said flanged collar; said flanged collar having an outer flange for selectively engaging the outer face of said front plate with the collar selectively positioned for insert tightening and position hold of the chassis unit; and said collar being provided with an inner flange for selective insertion in the recess of the front plate and for engagement with the inner surface of the outer lip of the recess during extract of the chassis unit.

2. Apparatus for insert tightening, position hold, and extracting of chassis units from opposite sides of a shelf of a mounting rack, including: an insert-extract device having, a screw member with a threaded portion, a shank, and a torque imparting portion; said device also having a flanged collar rotatively mounted on the shank of said screw member, and means on said screw member limiting axial displacement of said collar longitudinally relative to said screw member; a threaded opening in said rack shelf sized for operationally receiving the threaded portion of said screw member; said chassis units including, first and second chassis units adapted for removable mounting on opposite sides of said rack shelf; said first and second chassis units being provided with a collar flange engagable insert tightening surface; said first and second chassis units being provided with a collar flange engagable extract surface; and said flanged collar being provided with flange means shaped to provide selective engaging alignment with, and clearance from both said insert surfaces and said extract surfaces in various combinations according to various rotationally set positions of said collar for selective insert tightening and selective extraction of said first and second chassis units.

3. The apparatus of claim 2 wherein, the maximum total possible contact area between the flange means of said flanged collar and said insert surfaces of the first and second chassis units is different than the maximum total possible contact area between the flange means of said flanged collar and said extract surfaces of said first and second chassis units with rotationally set collar positions for maximum areas of contact between the collar and the first and second units in both the insert and the extract states.

4. The apparatus of claim 3 wherein, the maximum total possible area of contact between the flange means of the collar and said extract surfaces is less than the maximum total possible area of contact between the flange means of the collar and said insert surfaces between optimum area of contact settings of the collar for both the insert and extract states.

5. The apparatus of claim 2 wherein, said flanged collar is provided with an outer flange, and an inner flange; each of said first and second chassis units being provided with a wall having an outer surface and an inner surface comprising, respectively, said insert tightening surface, and said extract surface.

6. The apparatus of claim 5 wherein, said outer flange is D-shaped; and said inner flange is partially a duplicate of, in longitudinal alignment with, the duplicated portion of the outer flange, and with the inner flange cut down from the shape of the outer flange from one end to form generally an enlarged quarter shaped section.

7. The apparatus of claim 5 wherein, each of said first and second chassis units is provided with a recess having an outer lip comprising, said wall with an outer surface being said insert tightening surface, and an inner surface being said extract surface; and with said first and second chassis units being positioned to selectively receive said inner flange within said recess, and for the outer lip of the respective chassis units to be selectively straddled in overlying alignment by the outer and inner flanges of said collar.

8. The apparatus of claim 2 wherein, said means on said screw member limiting axial displacement of said collar comprises: rings fixed on said screw member to each side of said collar.

9. The apparatus of claim 2 wherein, said torque imparting portion comprises a crank arm.

10. The apparatus of claim 2 wherein, said torque imparting portion comprises a wing head.

11. The apparatus of claim 2 wherein, said insert-extract device is provided in multiple for engagement in multiple by various of said insert-extract devices with chassis units removably mounted on opposite sides of the rack shelf.

References Cited in the file of this patent
UNITED STATES PATENTS

| | | |
|---|---|---|
| 2,466,370 | Burtt | Apr. 5, 1949 |
| 2,802,997 | Bronckhurst et al. | Aug. 13, 1957 |
| 3,061,761 | Blain | Oct. 30, 1962 |

FOREIGN PATENTS

| | | |
|---|---|---|
| 747,026 | Great Britain | Mar. 28, 1956 |